United States Patent [19]
Werner et al.

[11] Patent Number: 5,178,288
[45] Date of Patent: Jan. 12, 1993

[54] PUSH BACK PALLET RACK

[75] Inventors: Hans J. Werner, King City; David S. Schut, Rockwood; Anthony W. J. Evers, Bolton, all of Canada

[73] Assignee: Interroll Canada Limited, Aurora, Canada

[21] Appl. No.: 793,547

[22] Filed: Nov. 18, 1991

[51] Int. Cl.$^5$ ............................................. A47F 5/00
[52] U.S. Cl. ........................... 211/151; 211/59.2; 211/162; 414/276
[58] Field of Search ............... 211/151, 162, 59.2, 211/191; 414/276, 286; 280/157; 16/18 CG; 52/67

[56] References Cited

U.S. PATENT DOCUMENTS

| | | | |
|---|---|---|---|
| 1,415,436 | 5/1922 | Germann et al. | 280/157 X |
| 2,218,444 | 10/1940 | Vineyard | 211/59.2 |
| 2,471,958 | 5/1949 | Humphreys | 16/18 CG |
| 2,969,863 | 1/1961 | Woldring | |
| 3,745,725 | 7/1973 | Boucaud | 52/67 |
| 4,341,313 | 7/1982 | Doring | 211/151 |
| 4,462,500 | 7/1984 | Konstant et al. | 211/151 |
| 4,687,404 | 8/1987 | Seiz et al. | 414/276 |
| 4,715,765 | 12/1987 | Agnoff | 414/276 |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,982,851 | 1/1991 | Konstant | 211/151 |
| 4,988,251 | 1/1991 | Kinney | 414/276 |
| 5,117,990 | 6/1992 | Krummell et al. | 211/151 |

FOREIGN PATENT DOCUMENTS 0324964 7/1989 European Pat. Off.
2722361 11/1978 Fed. Rep. of Germany.

Primary Examiner—Carl D. Friedman
Assistant Examiner—Derek J. Berger
Attorney, Agent, or Firm—Nixon & Vanderhye

[57] ABSTRACT

An improved push back pallet rack for loading and unloading pallets in which parallel channels inclining upward and rearward from a front of the rack on which pallets are stored are joined along their length and have longitudinal grooves, convex within each channel, to provide a lateral bumper guide(s) and a track on which carrier rails to support a pallet are mounted with rollers having concave rolling surfaces to roll on the track and are adapted with self-righting rolling surfaces.

5 Claims, 4 Drawing Sheets

PUSH BACK PALLET RACK

This invention relates to a pallet rack which may be used to store pallets of goods in a warehouse. In particular, the invention relates to an improved construction of an inclined push back pallet rack having a plurality of tracks supporting carrier rails at different heights in which the uppermost exposed carrier rails receive a pallet and are pushed by a next loaded pallet to roll on the tracks into the pallet rack to permit successive loading of pallets from the front of the pallet rack or, by reverse procedure, the unloading of same.

DESCRIPTION OF THE PRIOR ART

U.S. Pat. No. 2,969,863 which issued to Woldring Jan. 31, 1961 describes an inclined storage rack where boxes of goods may be fed in at one end and transferred to another end for removal. The present invention contemplates a substantially different operation in which loading and removal takes place at the same end of the rack. Accordingly, the structure of the present invention is substantially different from that disclosed in Woldring.

German patent 2,722,361 which issued to Kettner Nov. 30, 1978 describes warehouse storage lines for goods on pallets having two multi-part support surfaces on the lines. One such support surface is fixed and the other surface is vertically movable. This patent is of general interest only.

U.S. Pat. No. 4,341,313 which issued to Doring Jul. 27, 1982 describes a shelving for pallets in which compartments defined by the frame are continuous in side by side relationship and on top of one another and adapted to receive at least three pallets, one behind the other on a support which is inclined toward a common loading and unloading side. Each compartment is provided with at least one pair of rails which extend at an inclination toward the common loading and unloading side and accommodate two flat pallets carriages of different heights in rolling engagement. In operation, a first pallet may be loaded on the upper most carriage, a second pallet may be used to push back the first carriage to expose the lower carriage and a second pallet may be loaded upon it. A third pallet may be used to push back the lower carriage to expose the rail onto which the third pallet may be loaded. As each pallet is removed, the carriages roll forward to permit the next successive pallet to be unloaded. The carriages ride on inclined rails so that they are biased towards the lower end by gravity. While the structure of the present invention is substantially different from that of the Doring patent, Doring does disclose the incline system where successive pallets may be loaded by pushing back previously loaded pallets. The present invention obviates the need for the carriages described in Doring and provides a simpler, more cost efficient structure.

U.S. Pat. No. 4,462,500 which issued to Konstant et al. on Jul. 31, 1984 describes a storage rack having bays for accepting three loads of goods from an open front end. Telescoping upper and lower trolleys are provided which move along a rail assembly. The upper and lower trolleys are successively loaded and moved rearward to allow loading of a third pallet directly on the rail. This patent deals with the problem that arises when a pallet is partially unloaded on the pallet rack. The partially unloaded pallet may be dislodged and shoved into an aisle by pallets behind it which are forward biased on an incline. Konstant provides a breaking apparatus to prevent such accidents. Such a breaking apparatus is not the subject of the present invention.

U.S. Pat. No. 4,687,404 which issued to Seiz et al. on Aug. 18, 1987 describes another push back multi-load storage rack utilizing successive carriages of different heights to support the loads. The structure contemplates wheels on lower carriages which permit upper carriages to ride over them. While the Seiz patent illustrates another example of the carriage approach to the multiple load push back storage rack, it is of a substantially different construction from that of the present invention.

German patent 324,964 which issued to Henkel Kommanditgesellschaft Auf Aktien describes another more complex inclined pallet loading system using the multiple carriage type technology.

U.S. Pat. Nos. 4,773,546, 4,915,240 and 4,982,851 which issued to Konstant on Sep. 27, 1988, Apr. 10, 1990 and Jan. 8, 1991, respectively, discuss different improvements to a pallet rack storage system using the carriage type of technology.

U.S. Pat. Nos. 4,949,852 and 4,955,489 which issued to Allen on Aug. 21, 1990 and Sep. 11, 1990, respectively, describe another approach to the multiple pallet storage rack utilizing the upper and lower carriage type of technology.

U.S. Pat. No. 4,988,251 which issued to Kinney Jan. 29, 1991 describes a yet further approach to a multiple pallet storage rack having carriages which ride on rails which, in turn, ride within lower rails.

It will be seen from the disclosure which follows that the approach taken in the present invention is substantially different from patents having pallets resting on carriages.

Also known in the prior art is the Stack Rail [1] Pallet Storage System of Interoll Corporation which is the subject of U.S. Pat. No. 4,715,765. In this system, instead of having the pallets loaded on carriages which in turn ride upon rails or tracks, the pallet is loaded directly on the carrier rails which ride over one another on a single set of rollers. The carrier rails are stacked one over the other so that as each carrier rail is pushed back with its pallet load, it exposes the underlying carrier rail for loading of the next pallet.

[1] Trade mark of Interoll Corporation

Another prior art structure known to the applicant is that of Karl-Heinz Beckmann in which carrier rails fitted with rollers are laid in parallel channels having raised tracks. Each carrier rail is placed at a different height to permit successive loading of pallets.

DESCRIPTION OF THE PRESENT INVENTION

The present invention is directed to a push back pallet rack for loading and unloading pallets. More particularly, the present invention relates to an improved push back pallet loading system in which a plurality of carrier rails move on tracks located within parallel channels. The carrier rails are maintained, in pairs or other appropriate sets, at different heights to permit successive loading of pallets utilizing the conventional push back method. The invention is characterized by loading and unloading mechanisms that each include a matching set of units in which each unit comprises groups of parts. One group of parts comprises a plurality of parallel channels longitudinally inclining upward and rearward from a front of the rack. The channels are of a length sufficient to store a plurality of pallet loads.

Each channel is joined along its length to an adjacent channel to unify the structure of the channels to provide greater stability at minimal cost. In a preferred means of linking the channels, which is discussed in more detail later, an overlapping flange extending along the length of a first side of each channel is bent over upon itself to create a gap into which a portion of a second side of the next adjacent channel may be fitted and secured.

Each of the channels preferably has a bottom and first and second sides and is generally U-shaped in cross section. Along at least one side of the channel there is at least one longitudinal groove which is convex towards (i.e. within) the channel. The rigidity and strength of the channels may be improved by such grooves in one or both of the first and second side walls. The grooves are made convex towards the inside of the channel so as to provide inner lateral bumper guides to maintain the carrier rails in position in the channels.

The bottom of each of the channels has another inwardly (upwardly) convex groove to provide further rigidity and to provide a raised track on which the carrier rails ride.

The carrier rails are of a length sufficient to support a pallet load. Each carrier rail is mounted on a plurality of rollers having concave rolling surfaces to roll on a track in a channel. Each channel supports one carrier rail.

Each track has a profile in cross section of a flat top, and downward curving edges and each rolling surface of the rollers has a profile of a slightly wider flat surface than the track and curving edges that follow the curvature of the edge of the track with the same radius of curvature as the track. The carrier rails have rollers with U-shaped rolling surfaces which flare outwardly to fit loosely over the sides of the raised track. The track has an essentially flat top which conforms to the flat rolling surface of the rollers. The curvature of the edges of the tracks and the inside edges of the rollers have the same radii.

The bottom groove forming the track is sufficiently deep in relation to the profile of the roller that a well is provided on each side of the track to receive debris falling into the channel. A sweeper may be fitted to the carrier rails to sweep the track during operation. Further details of the preferred embodiment will follow.

DESCRIPTION OF FIGURES

In the Figures that illustrate this invention.

DESCRIPTION OF THE PREFERRED EMBODIMENT

In the Figures and in this description like numerals indicate like elements.

The general structure of a inclined pallet rack is known to those skilled in the art and will not be discussed here. Instead, this disclosure will concentrate on the novel structure of the carrier rails, the supporting channel and the integral track mechanism which are the elements of a pallet rack to which this invention is directed.

Figure 1:
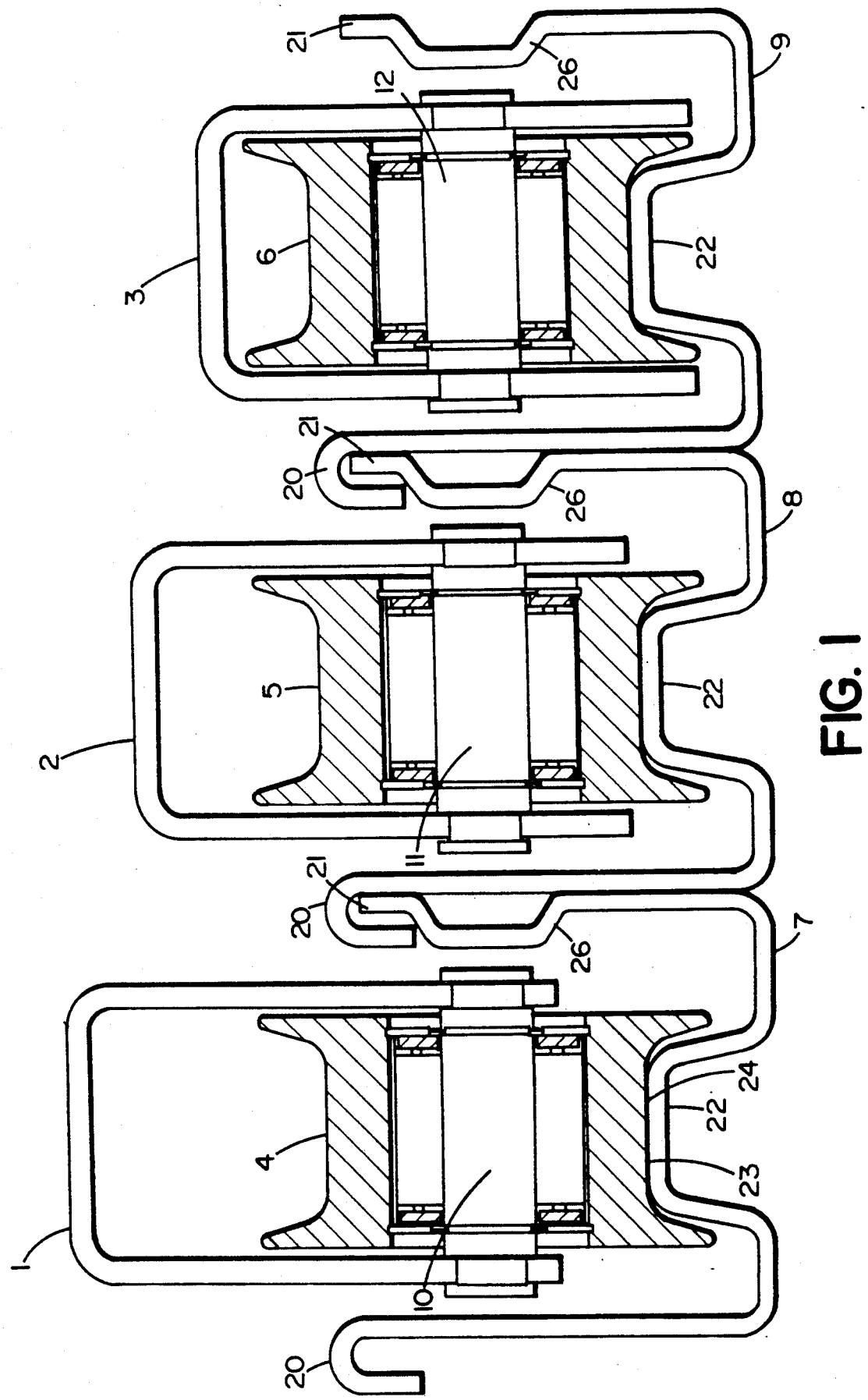
FIG. 1 is an end view of the preferred embodiment of the pallet rack of this invention.
Figure 2:
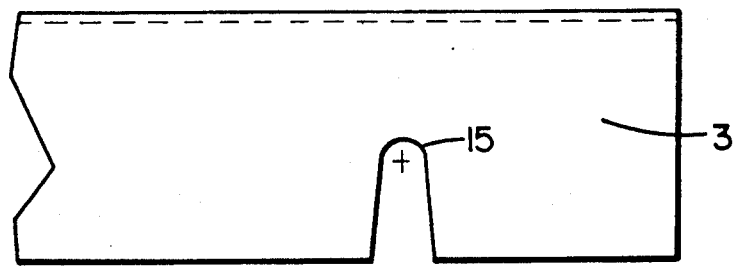
FIGS. 2, 3 and 4 are side views of the roller axle attachment to the carrier rail of the preferred embodiment of this invention.
Figure 3:
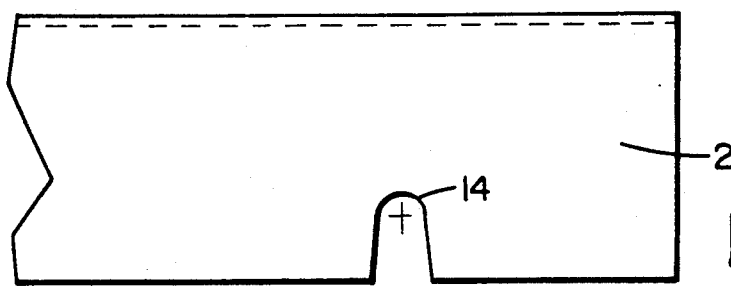
Figure 4:
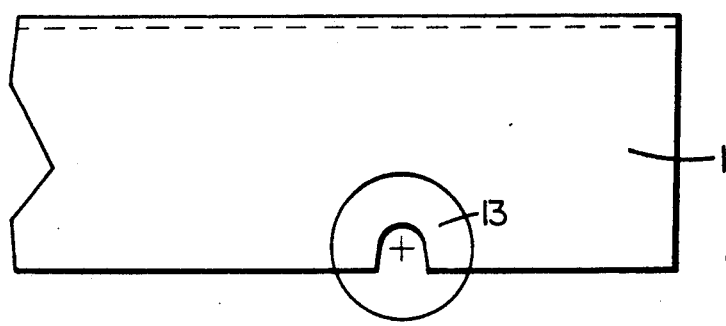

FIG. 1 represents a cross-sectional view of one half of the carrier mechanism of this invention. The other part, not shown, would be a mirror image replication of that illustrated and located parallel to it a short distance away, (somewhat less than the width of a pallet load). The two portions would together support a pallet load between them. It will be appreciated that other parallel units could be used to make up a a set having any desired number of carrier rails for each pallet. Referring to FIG. 1, carrier rails (1), (2) and (3) ride on rollers (4), (5) and (6) in channels (7), (8) and (9) respectively. The channels are inclined upwardly and rearwardly into the page. Each roller is conventionally mounted on axles (10), (11) and (12) respectively. The top of each carrier rail (1) (2) and (3) lies in a successively lower plane. Thus, the uppermost carrier rail at any time will receive a next pallet to be loaded onto the system. Each loaded pallet may be pushed back by the next loaded pallet in the conventional push back method of loading pallets into such systems. As each pallet is pushed back the carrier rails on which it rests are rolled up the inclined rack in their respective channels. The next lower carrier rails are then exposed to receive the next pallet. For example, the carrier rail (1) would receive the first pallet, carrier rail (2) would receive the next pallet and carrier rail (3) would receive the next. A final load may be loaded directly on the channels (7), (8) and (9) which are all in the same plane.

The preferred manner of connecting the axles to the carrier rails is shown in FIGS. 2 through 6. As stated, each carrier rail is adapted to lie in a different plane. It will be understood that it is advantageous from a cost and from a manufacturing point of view to use standard sizes and standard manufacturing techniques. It is part of this invention to allow standard sizes to be used for every carrier rail and to obtain different heights by mounting the roller axles (4), (5) and (6) at different heights within the rails. A preferred means to obtain different heights is to provide suitably spaced cutouts (13), (14) and (15) in the sides of the carrier rails (1), (2) and (3) respectively to receive the axles (10), (11) and (12) with an interference fit connection. Each cutout is deeper than the previous one so that the axles (10), (11) and (12) and, accordingly, the rollers (4), (5) and (6) are mounted in successively higher positions in the carrier rails (1), (2) and (3). Since the rollers (4), (5) and (6) ride over the channels (7), (8) and (9) that are all in the same plane, the top of carrier rails (1), (2) and (3) each lie in successively lower planes.

Figure 5:
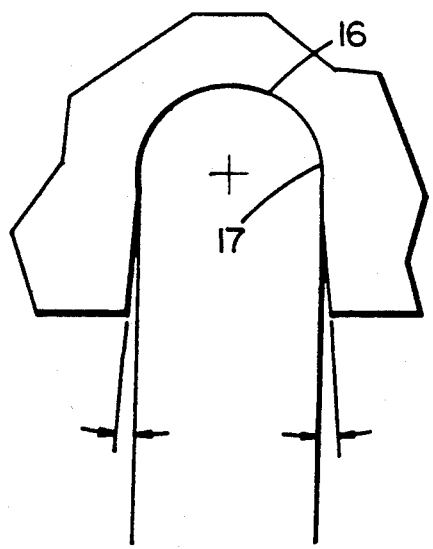
FIG. 5 is a detail of the interference fit connection of the axle in the carrier rail of the preferred embodiment of this invention.
Figure 6:
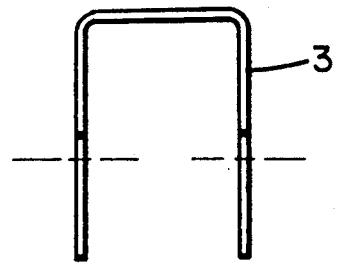
FIG. 6 is a cross section of the carrier rail of the preferred embodiment of this invention.

As illustrated in FIG. 5, a interference fit engagement of an axle in a cutout may be obtained by providing a partial circle portion (16) which narrows to a neck (17) that is slightly less than the diameter of an axle to be fitted into the partial circle (16). Thus the axle may be fitted into the cutout to the neck (17) and then knocked through to become fixed in the partial circle portion (16) of the cutout.

Returning now to FIG. 1, other features of the invention may be described. These elements are found in the structure of the channels (7), (8) and (9). Again, the object is to provide functional elements for a variety of purposes while using a standard structure for all channels.

The first common features shown in FIG. 1 relating to the structure of the channels of this invention comprise an overlapping flange (20) on the left side of each channel and an upright flange (21) on the right side of each channel. As shown the overlapping flange (20) laps over the upright flange (21) to form a joint stretching along the length of the adjoining channels. Suitable conventional means may be employed to secure the joint such as compression, welding etc. that are within the state of the art and do not require elaboration. The choice of the means of locking the parts together will depend on the loads anticipated in a particular use. The joint thus obtained provides the functional advantage of greater rigidity and stability of the channels at minimal cost and with minimal additional structure. Each channel becomes part of the support for the adjacent channels. The inertia of the pallets loaded on previous channels resists deflection and vibration when later pallets are loaded above subsequent channels. Furthermore additional channels may be easily added, if desired.

Another feature common to all channels is the track (22). As explained above, the means by which the carrier rails are connected to the rollers allows the carrier rails to lie in successively lower planes relative to one another. Accordingly, it is possible to manufacture each channel with an identical track structure and yet achieve different heights for the carrier rails. The track (22) is preferably designed in conjunction with the rollers (which also have a uniform shape) to achieve the most favourable rolling and self-righting characteristics. Preferably the rolling surface (23) of the rollers and the top surface (24) of the track (22) are flat across their central portion. The top surface (24) of the track (22) curves down and continues downwardly and outwardly. The rolling surface (23) of the roller follows a similar path but flares outwardly wide of the track (22). It is preferred that the roller slope outward at an angle of about 15 degrees and that the track slope outwardly at an angle of about 10 degrees. It has been empirically determined that it is important that the radii of curvature of the roller and the track be the same at the point where they curve downwards. The result of this design is that if the roller is shifted laterally on the track it will ride up on the inner rolling surface of the roller which will tend to force it to return to a more central position. The additional flare in the roller contour over the track contour permits some lateral tipping without jamming of the rollers on the track by "wiping" since the lower surfaces of the roller will move at greater speeds relative to the track. The relative stability of the roller on the track will also be dependent on the width of the track and the roller and the height of the center of gravity of the rail and roller assembly over the track in the unloaded condition and on the load forces in the loaded condition. The tolerances of lateral shift in the roller bearings must also be considered. The determination of the center of gravity of the roller-rail assembly and its relationship to the track width will be matters of design within the state of the art in particular systems employing the features of this invention.

Additional stability for the carrier rails is obtained from the lateral bumper guides (26) which are the inside convex protrusion of the longitudinal stiffening grooves formed in the side walls of the channels. In the preferred embodiment shown only one lateral bumper guide is shown but it will be appreciated that there could be lateral bumper guides and corresponding stiffening grooves on either side of the channel. The lateral bumper guides (26) are adapted to bump against the end of the axles (10), (11) or (12) to right the rollers and carrier rails, if they tip over in operation beyond the self-righting ability of the roller and track design.

Figure 7:
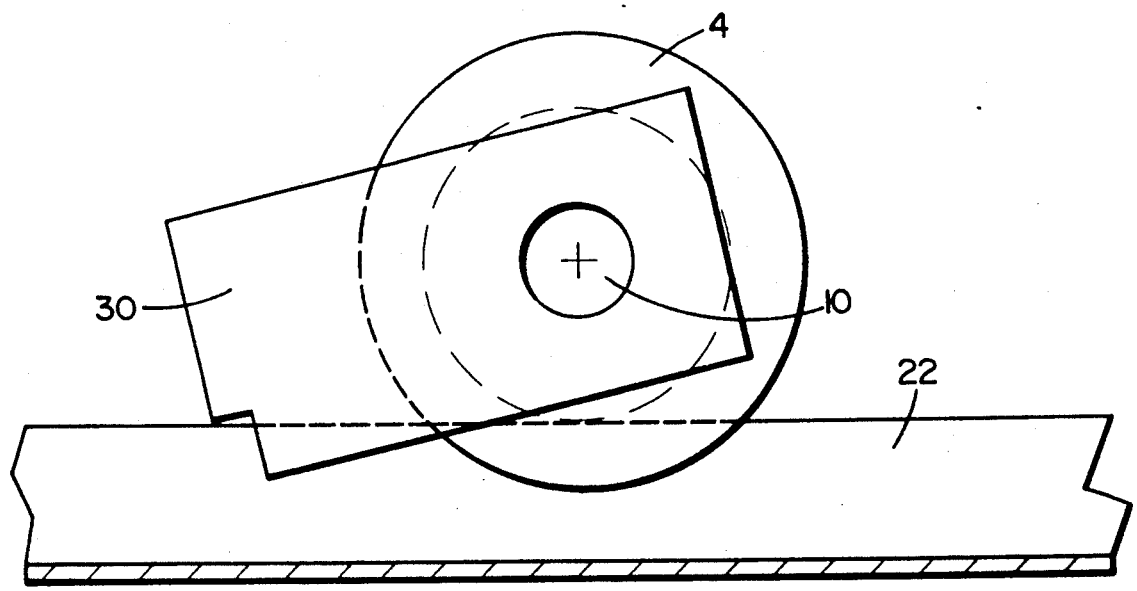
FIG. 7 is a side view of the sweeper of the preferred embodiment of this invention
Figure 8:
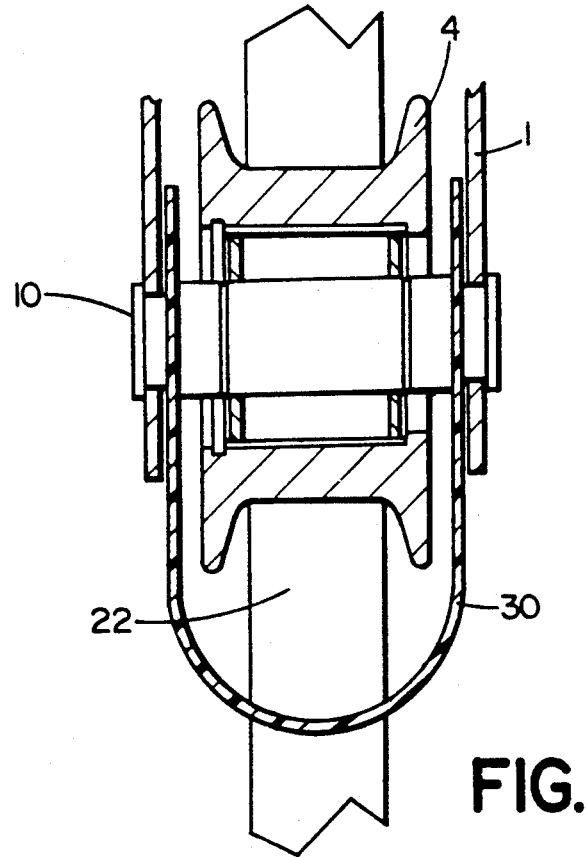
FIG. 8 is a plan view of the sweeper of the preferred embodiment of this invention.
Figure 9:
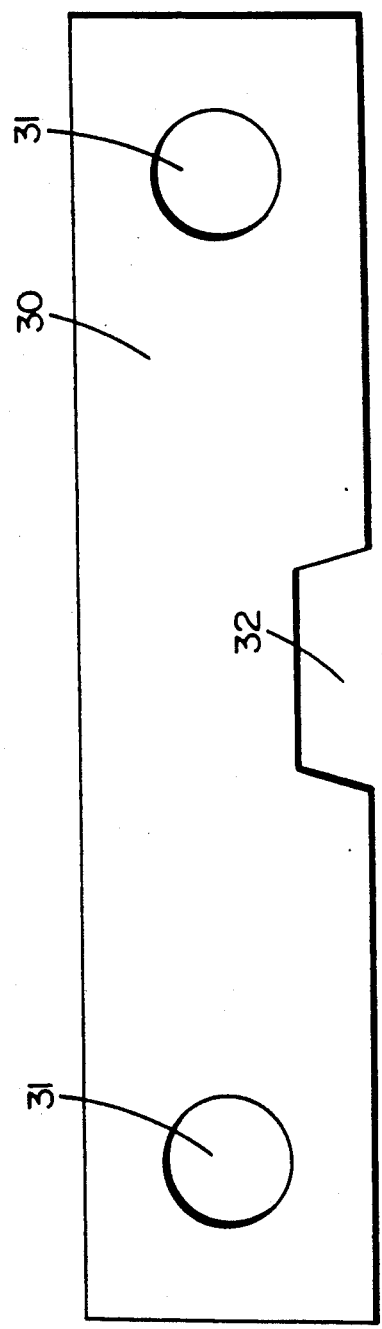
FIG. 9 is a detail of the sweeper of the preferred embodiment of this invention.

FIGS. 7, 8 and 9 illustrate the sweeper (30) which is shown for example on carrier rail (1). The sweeper (30) has axle holes (31) adapted to be mounted on an axle (4) inside a carrier rail (1) and a track guide (32) adapted to fit over a track (22). The sweeper (30) thus mounted on an axle (10) is adapted to sweep the track to remove debris from the track that otherwise might interfere with a roller (4). The debris may fall into the wells in the channel on either side of the track. The sweeper (30) is preferably made of a flexible material such as plastic foam and is adapted to pivot on the axle so that it will bump over objects in the wells rather than becoming jammed. While the sweeper (30) may also push debris out of the wells, its most important task is to sweep the top of the track.

INDUSTRIAL APPLICABILITY

The improvements in the invention disclosed provide a cost effective and simple construction and manufacture of a push back pallet loading rack. The commercial value of the push back pallet loading system is well known to persons skilled in the art.

What is claimed is:

1. A push back pallet rack for loading and unloading pallets characterized by at least one loading and unloading mechanism that includes a matching set of units in which each said unit comprises:

a plurality of parallel channels longitudinally inclining upward and rearward from a front of the rack said channels being of a length sufficient to store a plurality of pallet loads wherein each said channel is joined along its length to an adjacent channel and has a bottom and first and second sides, is generally U-shaped in cross section, has along at least one side thereof at least one longitudinal groove being convex within said channel to provide a lateral bumper guide, and has a track formed within the bottom of the channel by a longitudinal groove convex within the channel;

a plurality of longitudinal carrier rails of a length sufficient to support a pallet load, each carrier rail being mounted on a plurality of rollers having concave rolling surfaces to roll on a track in a channel.

2. The pallet rack of claim 1 in which each track has a profile in cross section of a flat top, and downward curving edges and each rolling surface of the rollers has a profile of a slightly wider flat surface than the track and curving edges that follow the curvature of the edge of the track with the same radius of curvature as the track.

3. The pallet rack of claim 2 in which the bottom groove is sufficiently deep in relation to the profile of the roller that a well is provided on each side of the track to receive debris falling into the channel.

4. The pallet rack of claim 2 in which one or more sweepers are attached to an axle of a roller of a carrier rail to sweep the track as the rollers move along the track.

5. The pallet rack of claim 1 in which one or more sweepers are attached to an axle of a roller of a carrier rail to sweep the track as the rollers move along the track.

* * * * *